(12) United States Patent
Crombie et al.

(10) Patent No.: US 9,539,879 B2
(45) Date of Patent: *Jan. 10, 2017

(54) SYSTEM FOR TRACKING AND TESTING GENERATOR SETS USED IN CONJUNCTION WITH TEMPERATURE CONTROLLED CONTAINERS

(71) Applicant: THERMO KING CORPORATION, Minneapolis, MN (US)

(72) Inventors: Dermott C. Crombie, Dublin (IE); Michael Stark, Redding, CA (US); Arlo G. Eslinger, Kent, WA (US); Randy Burnham, St Michael, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,707

(22) Filed: Mar. 7, 2016

(65) Prior Publication Data

US 2016/0185183 A1 Jun. 30, 2016

Related U.S. Application Data

(63) Continuation of application No. 13/708,377, filed on Dec. 7, 2012, now Pat. No. 9,310,279.

(51) Int. Cl.
*B60P 3/20* (2006.01)
*B60H 1/00* (2006.01)
(Continued)

(52) U.S. Cl.
CPC ...... *B60H 1/00978* (2013.01); *B60H 1/00264* (2013.01); *B60H 1/00378* (2013.01);
(Continued)

(58) Field of Classification Search
CPC .......... B65D 2590/0083; B60H 1/00014; B60H 1/00264; B60H 1/00735; B60H 1/00764; B60H 1/00774; B60H 1/00778; B60H 1/32; B60H 1/3205; B60P 3/20; F25D 11/00; F25D 11/003; F25D 29/003; G06Q 10/0832; G06Q 10/0833; H04Q 9/00; H04Q 9/02
See application file for complete search history.

(56) References Cited

U.S. PATENT DOCUMENTS

| 4,819,441 A | 4/1989 | Hanson |
| 5,123,252 A | 6/1992 | Hanson |
| (Continued) | | |

FOREIGN PATENT DOCUMENTS

| EP | 1912327 | 4/2008 |
| JP | 8000166 | 1/1996 |
| (Continued) | | |

OTHER PUBLICATIONS

International Search Report for International Application No. PCT/US2013/071159, dated Mar. 31, 2014 (7 pages).

(Continued)

*Primary Examiner* — Jonathan Bradford
(74) *Attorney, Agent, or Firm* — Hamre, Schumann, Mueller & Larson, P.C.

(57) ABSTRACT

A generator set system for use with a refrigerated shipping container, the generator set system including a prime mover, a generator coupled to the prime mover, a generator set controller, and a generator set telematics unit. The generator set telematics unit determines a geographical location of the generator set, and the generator set controller performs pre-trip inspections on the generator set prior to the generator set leaving a pre-defined geographical area.

25 Claims, 3 Drawing Sheets

(51) Int. Cl.
*F25D 29/00* (2006.01)
*G01M 99/00* (2011.01)
*G01S 19/13* (2010.01)
*F25D 11/00* (2006.01)

(52) U.S. Cl.
CPC ........... *F25D 29/00* (2013.01); *F25D 29/003* (2013.01); *G01M 99/005* (2013.01); *G01S 19/13* (2013.01); *B60H 1/00014* (2013.01); *B60H 1/00771* (2013.01); *B60P 3/20* (2013.01); *B65D 2590/0083* (2013.01); *F25D 11/003* (2013.01)

(56) References Cited

U.S. PATENT DOCUMENTS

| | | |
|---|---|---|
| 5,161,384 A | 11/1992 | Hanson et al. |
| 5,172,561 A | 12/1992 | Hanson et al. |
| 5,181,389 A | 1/1993 | Hanson et al. |
| 5,437,163 A | 8/1995 | Jurewicz et al. |
| 5,438,841 A | 8/1995 | Cahill-O'Brien et al. |
| 5,564,285 A | 10/1996 | Jurewicz et al. |
| 5,579,648 A | 12/1996 | Hanson et al. |
| 5,977,647 A | 11/1999 | Lenz et al. |
| 6,067,805 A | 5/2000 | Porter et al. |
| 6,176,095 B1 | 1/2001 | Porter |
| 6,233,952 B1 | 5/2001 | Porter et al. |
| 6,829,523 B2 | 12/2004 | Hanson |
| 6,996,997 B2 | 2/2006 | Wiff et al. |
| 9,097,456 B2 | 8/2015 | Thogersen et al. |
| 2001/0054293 A1 | 12/2001 | Gustafson et al. |
| 2004/0183673 A1 | 9/2004 | Nageli |
| 2006/0030333 A1 | 2/2006 | Ward et al. |
| 2007/0267509 A1 | 11/2007 | Witty et al. |
| 2008/0125964 A1 | 5/2008 | Carani et al. |
| 2009/0055091 A1 | 2/2009 | Hines et al. |
| 2009/0228155 A1 | 9/2009 | Slifkin et al. |

FOREIGN PATENT DOCUMENTS

| | | |
|---|---|---|
| WO | 03021163 | 3/2003 |
| WO | 2004068160 | 8/2004 |
| WO | 2009067694 | 5/2009 |

OTHER PUBLICATIONS

European Search Report for corresponding European Application No. 11190707.7 dated May 1, 2012 (6 pages).
"http://connection.ebscohost.com/c/articles/25082308/thermo-king-adds-security-geo-fencing-tracking"; "Thermo King adds security geo-fencing to TracKing"; Motor Transport, Apr. 2007.
"http://refrigeratedtransporter.com/business-tools/tracking-system-redefines-security-pace-airfreight"; "TracKing system redefines security for PACE Airfreight",Refrigerated Transporter, Dec. 2009.
"http://www.thermokingmichigan.com/tracking_telematics.htm"; "TracKing—Telematics"; Thermo King Michigan, Inc., Jan. 2009.
Office Action issued in corresponding European Application No. 13859635.8 dated Jun. 21, 2016 (9 pages).

SYSTEM FOR TRACKING AND TESTING GENERATOR SETS USED IN CONJUNCTION WITH TEMPERATURE CONTROLLED CONTAINERS

BACKGROUND

The invention relates to tracking and testing generator sets used in conjunction with temperature controlled containers, and particularly to a method of tracking and automatically performing pre-trip inspections on generator sets prior to the generator sets leaving a defined geographical area.

Containerized shipment of goods has become a widely accepted means of transporting cargo around the world. Modern containers can be stacked on the decks of ships for shipment overseas. When a container ship arrives at a port, the containers can be efficiently removed from the ship by crane. At the port, the containers can be stacked for further shipment by truck or rail. When the containers are shipped by truck, a single container is usually placed on a semi-trailer chassis. Each rail car generally can support up to four containers.

When the cargo in the container is comprised of perishables such as food stuffs or flowers, the temperature in each of the containers must be controlled to prevent loss of the cargo during shipment. For shipments of perishable goods, specialized containers have been developed which include temperature control units for refrigeration and/or heating. While on board ship, the containers can be connected to a ship's generator to provide power to the temperature control units. When the containers are in port, they may be connected to a power source provided by a local utility.

When, however, the containers are not provided with an external power source generator sets must be provided to power the temperature control units. For example, when the containers are in transit by railcar, barge, or truck, generator sets may be necessary. Such generator sets usually include a prime mover and a generator for providing electric power to the temperature control units. Such generator sets can be clipped directly to a container or fastened to a trailer chassis.

The generator sets include components that over time, and with extended use, become worn, broken, and/or require maintenance. Thus, it is common for pre-trip inspections to be performed to determine the operating status of the components of the generator sets. These pre-trip inspections are diagnostic inspections that include inspecting and testing components of the generator sets with the aim of ensuring that only generator sets that fulfill certain quality criteria are used during an upcoming journey. These pre-trip inspections are carried out by technicians in the field (e.g. at a depot or service station) who manually initiate and run the diagnostics tests on the generator sets to determine whether the generator sets are in satisfactory condition for continued use.

However, such inspections are time consuming and require that a technician be available. Additionally, it is difficult to keep track of which generator sets have undergone pre-trip inspections and which have not, as well as to keep track of the location and status of the generator sets in the field at all times.

SUMMARY

In one embodiment, the invention provides an automated method for diagnostic testing of a generator set used in association with a refrigerated container for transporting cargo, the generator set including a plurality of components. The method includes determining whether the generator set has entered a geo-fenced area, determining whether a pre-trip inspection is due to be performed on the generator set, automatically performing a pre-trip inspection on the generator set if the generator set is located within the geo-fenced area and a pre-trip inspection is due to be performed, determining whether the plurality of components is operating within acceptable limits, and generating a satisfactory pre-trip inspection report based on the plurality of components, such that the generator set is approved for further use.

In another embodiment, the invention provides a generator set system for use in association with a refrigerated container for transporting cargo. The generator set system includes a generator set including a prime mover and a generator, a generator set telematics unit associated with the generator set, the generator set telematics unit including GPS technology to identify a geographical location of the generator set, a generator set controller associated with the generator set, the generator set controller including a microprocessor, the generator set controller programmed to be in communication with both the generator set and the generator set telematics unit, the generator set controller programmed to automatically perform a pre-trip inspection on the generator set while the generator set is within a geo-fenced area.

In another embodiment, the invention provides a refrigerated cargo system including a container for transporting cargo, a refrigeration system, and a generator set system. The refrigeration system includes a refrigeration unit located on or within the container, and a refrigeration unit controller that includes a first microprocessor, the refrigeration unit controller programmed to be in communication with the refrigeration unit. The generator set system includes a generator set including a motor and generator, and a generator set controller that includes a second microprocessor, the generator set controller programmed to be in communication with both the generator set and the refrigeration unit controller, the generator set controller programmed to automatically perform a pre-trip inspection on the generator set while the generator set is within a geo-fenced area.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
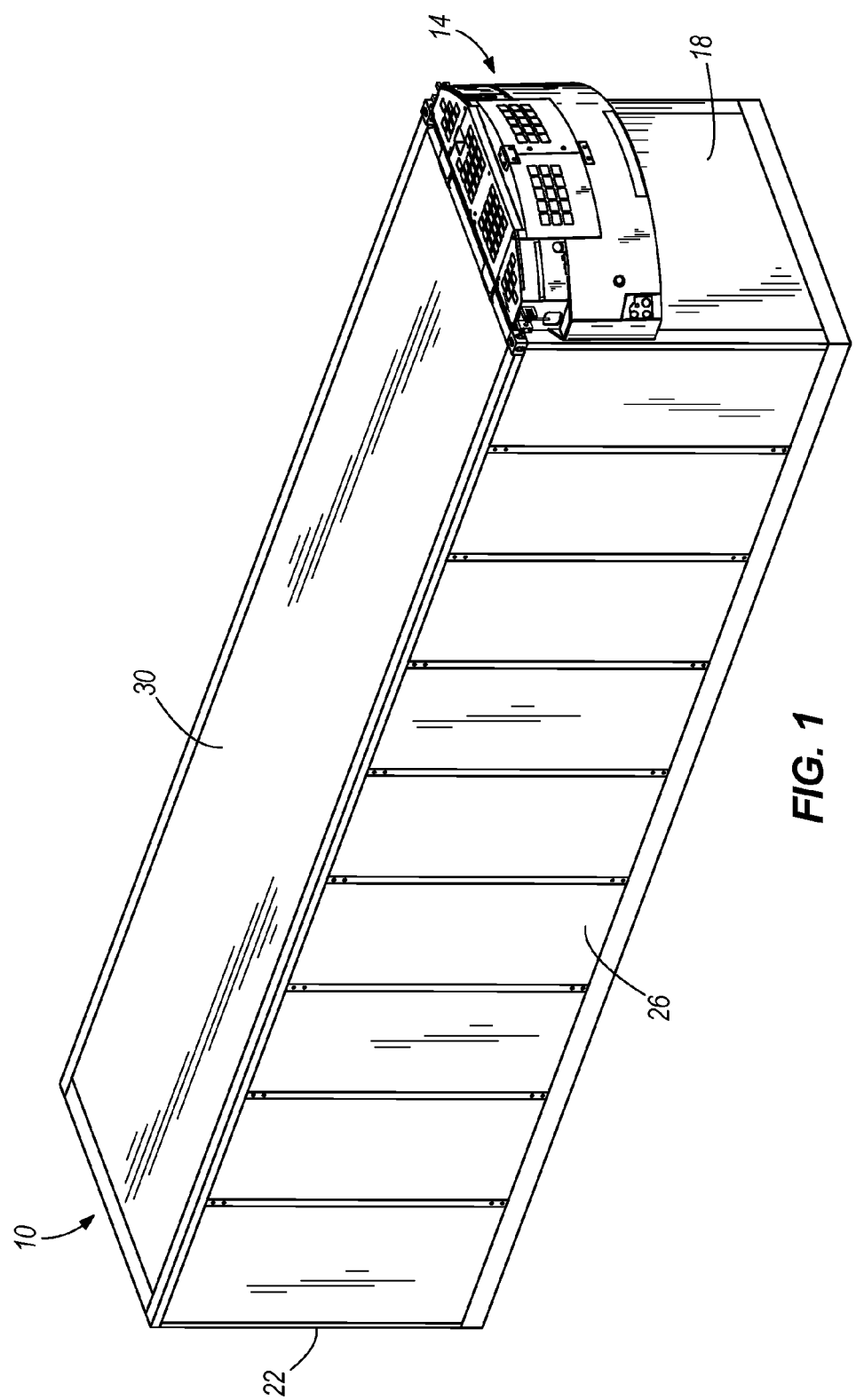
FIG. 1 is a schematic representation of a temperature controlled shipping container and generator set.

FIG. 1 shows a shipping container 10 that is used for transporting cargo of various types. The shipping container 10 is made of steel and generally includes four side walls, a top wall, and bottom wall. One of the side walls (not shown) includes a door or set of doors that allow selective access to a temperature controlled space inside the shipping container 10. In some embodiments, the shipping container 10 may have more or less doors, may be made of material other than steel, or may have other features as desired. A generator set 14 is removably coupled to a proximal end 18 of the shipping container 10. In some embodiments, the generator set 14 can be removably coupled to other locations on the shipping container 10, including but not limited to a distal portion 22, a side portion 26, a top portion 30, or anywhere underneath the shipping container 10. In some embodiments, the generator set 14 can be integrally formed with the shipping container 10.

Figure 2:
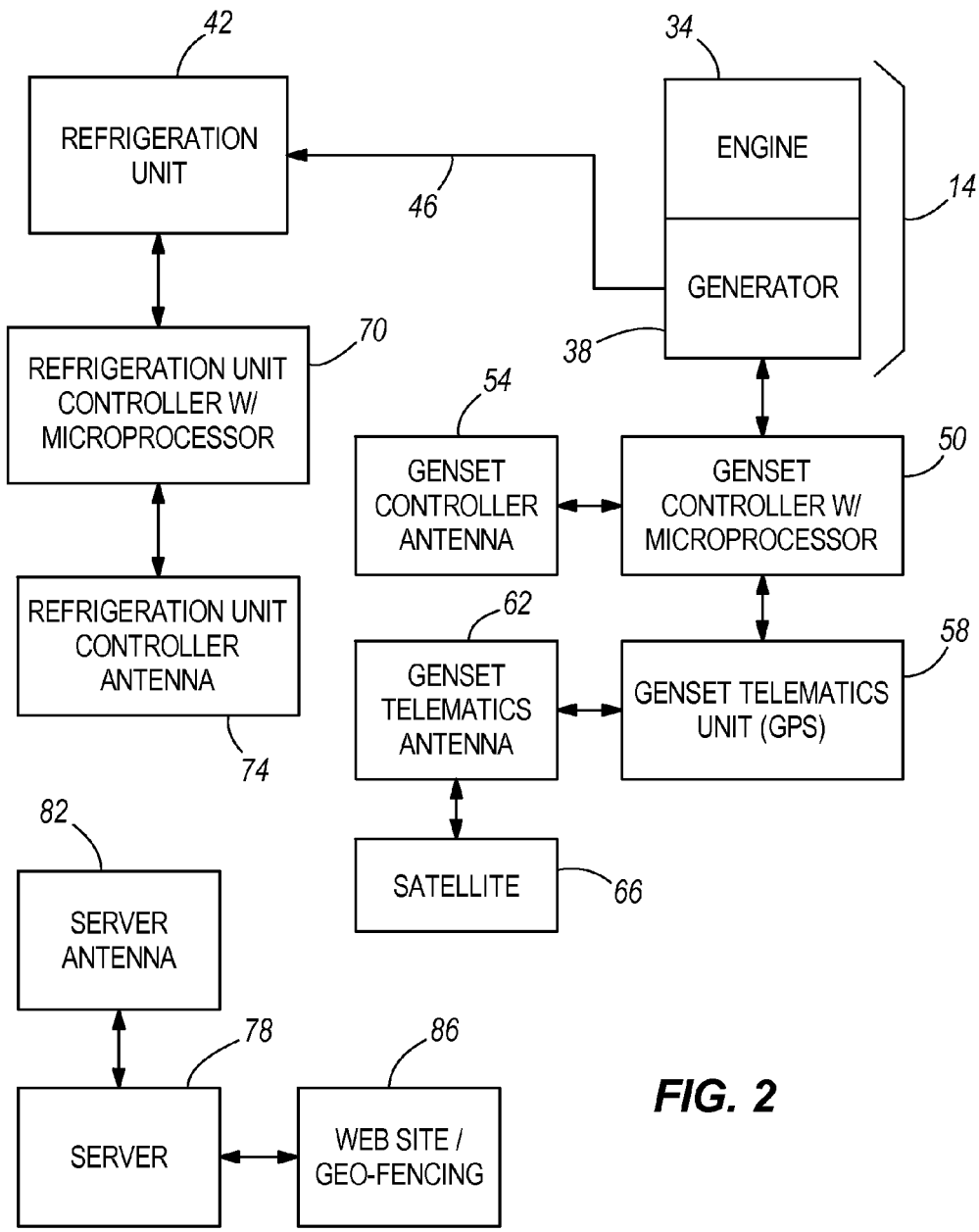
FIG. 2 is a schematic representation of a communications network for communicating between the container and generator set of FIG. 1, as well as with a remote server and web site.

Referring to FIG. 2, the generator set 14 includes a prime mover 34 and a generator 38. The generator 38 provides power for a refrigeration unit 42, and is connected to the refrigeration unit 42 via a power cord 46.

The generator set 14 is removably attached to the shipping container 10 such that the generator set 14 may be attached to the shipping container 10 when required (e.g., during transit on a train), and removed when the generator set 14 is not required (e.g., when being stored in a location where external power is available). For example, while a shipping container 10 is being stored at a shipping dock external power lines may be available, such that the generator set 14 is not necessary. While in transit, for example on a rail or train, the generator set 14 may be required to power one or more components.

The illustrated prime mover 34 is a diesel engine that includes an automatic starter and drives the generator 38. With respect to this application, a generator 38 is any electric machine that converts mechanical energy into electric energy. The illustrated generator 38 is an AC generator that produces a 50 hertz or 60 hertz alternating current output while the prime mover 34 is running. The generator 38 supplies electricity to any other system(s) that may be included in the shipping container 10.

The generator set 14 communicates with a generator set controller 50. The generator set controller 50 includes a microprocessor. The generator set controller 50 is programmed to control the operation of the generator set 14. For example, the generator set controller 50 determines an operating status of the generator set 14 (i.e. "on" or "off"). As discussed further herein, the generator set controller 50 is also programmed to perform pre-trip inspections on the generator set 14 to determine whether components of the generator set 14 are operating within acceptable limits, and to provide a pre-trip inspection report detailing whether the components of the generator set 14 are operating within acceptable limits. The generator set controller 50 is also programmed to indicate whether one or more components of a generator set 50 are currently malfunctioning, and to initiate an alarm if one or more of the components are malfunctioning. The generator set controller 50 is coupled directly to the generator set 14, though in other embodiments the generator set controller 50 can be coupled elsewhere.

With continued reference to FIG. 2, the generator set controller 50 is programmed to communicate with a generator set controller antenna 54. The generator set controller antenna 54 sends and/or receives signals (e.g. commands) from one or more remote systems or components. The generator set controller antenna 54 is also coupled directly to generator set 14, though in other embodiments the generator set controller antenna 54 can be coupled elsewhere.

The generator set controller 50 is further programmed to communicate with a generator set telematics unit 58. The generator set telematics unit 58 is a GPS unit associated with the generator set 14 that uses GPS technology to identify a geographic position of the generator set 14. Specifically, the generator set telematics unit 58 communicates with a generator set telematics antenna 62. The generator set telematics antenna 62 sends and/or receives signals from a satellite 66, which are then processed by the generator set telematics unit 58 to determine the geographical position of the generator set. The generator set controller 50 sends commands to the generator set telematics unit 58 to determine a position of the generator set 14 on a continuous basis, on an as-needed basis, or in any other manner desired. Both the generator set telematics unit 58 and generator set telematics antenna 62 are coupled directly to the generator set 14, though in other embodiments the generator set telematics unit 58 and generator set telematics antenna 62 can be coupled elsewhere.

Overall, an owner or operator of a plurality of generator sets 14 can utilize the generator set telematics units 58 to determine the exact geographical position of each of the owner's or operator's generator sets 14. In turn, this can provide the owner or operator with an indication of which generator sets 14 are moving, which generator sets 14 are stationary, as well as the directions of movement for each generator set 14, the speed of movement of each generator set 14, and the number of generator sets 14 in any given area at any given time. As noted above, it is generally difficult to keep track of the location and status of generator sets in the field in order to efficiently manage a fleet of generator sets on a continuous basis. For example, generator sets 14 often can compile or build up in inventory over time in one location. Additionally, while some generator sets 14 are in use with a refrigerated shipping container 10, others might be de-coupled from a refrigerated shipping container 10. By incorporating generator set telematics units 58 on each of the generator sets 14, the owner or operator can more efficiently manage a fleet of generator sets 14 and ensure that the generator sets 14 are in the most advantageous locations and conditions possible for eventual use with refrigerated shipping containers 10.

With continued reference to FIG. 2, the refrigeration unit 42 provides conditioned air to the temperature controlled space inside of the shipping container 10. The refrigeration unit 42 is formed as a part of the shipping container 10 and includes a compressor, a condenser, and an evaporator in series for producing the conditioned air. The refrigeration unit 42 conditions the air within the temperature controlled space to a desired condition. In other embodiments, the refrigeration unit 42 may include a heating system, an air-filtration system, a spray system for ripening agents or other products, or other components, as desired.

The refrigeration unit 42 communicates with a refrigeration unit controller 70. The refrigeration unit controller 70 includes a microprocessor. The refrigeration unit controller 70 is programmed to control the operation of the refrigeration unit 42. For example, a set-point temperature may be selected by a user and programmed into the refrigeration unit controller 70 such that the refrigeration unit 42 will operate to maintain the temperature within the temperature controlled space insider the shipping container 10 at the setpoint temperature. The refrigeration unit controller 70 is coupled directly to the refrigeration unit 42, though in other embodiments the refrigeration unit controller 70 can be coupled elsewhere (e.g. inside the cab or driving compartment of a truck for hauling the shipping container 10).

The refrigeration controller 66 is programmed to communicate with a refrigeration unit controller antenna 74. The refrigeration unit controller antenna 74 sends and/or receives signals (e.g. commands) from one or more remote systems or components. The refrigeration unit controller antenna 74 is coupled directly to the refrigeration unit 42, though in other embodiments the refrigeration unit controller antenna 74 can be coupled elsewhere.

In the illustrated embodiment the refrigeration unit controller 70 and generator set controller 50 are programmed to communicate with each other via the refrigeration unit controller antenna 74 and generator set controller antenna 54. Thus, the refrigeration unit controller 70 and generator set controller 50 can send signals and/or commands to one another, such as to increase temperature, increase electrical power output, etc.

With continued reference to FIG. 2, a remote server 78 is used to monitor the location of one or more generator sets 14, and to transmit commands to one or more of the generator sets 14 associated refrigeration units 42. For example, the remote server 78 communicates with a server antenna 82. The server antenna 82 sends and/or receives signals (e.g. commands) from one or more remote systems or components. Specifically, the server antenna 78 sends and/or receives signals from the generator set telematics antenna 62 regarding the geographical location of the generator set 14. The server antenna 78 also sends and/or receives signals from the generator set controller antenna 54 regarding the operation of the generator set 14 (e.g. requesting that the generator set 14 turn off or on, that the generator set 14 indicate its position through the generator set telematics antenna 62, that the generator set 14 perform a pre-trip inspection, that an alarm be provided indicating that a component of the generator set 14 is currently malfunctioning, etc.). In some embodiments the generator set controller antenna 54 can perform the functions of both the generator set controller antenna 54 and the generator set telematics antenna 62. Thus, the generator set controller 50 and generator set telematics unit 58 can utilize the same antenna.

The central server 78 communicates with a web site 86. The web site 86 permits the end user (i.e. the owner or operator of the generator sets 14) to visually access information relating to the generator sets 14. For example, the web site 86 provides information regarding one or more of an alarm status, power status, location status, and prime mover status of each of the generator sets 14. The web site 86 also provides information regarding a last known communication of each generator set 14 with the server 78. The web site 86 also provides a map, updated in real time, showing the current location of each generator set 14. If a generator set 14 is experiencing a malfunction in one of its components, the generator set 14 is illustrated in red on the map, representing an alarm. If the generator set 14 is not experiencing a malfunction, the generator set 14 is illustrated in green. Other colors or indications are also possible. If the end user sees that a generator set 14 is marked in red, the end user can easily identify the marked generator set 14 and issue a command to, for example, a driver of the truck carrying the container, informing the driver to pull over into the nearest depot or service station to have the generator set 14 repaired or replaced, and/or informing a technician that he or she will need to repair or replace the generator set 14. Alternatively, the web site 86 itself, in conjunction with the server 78 and server antenna 82, can send a signal via the server antenna to a depot or service station informing the technician of the alarm.

The web site 86 also provides information regarding geo-fenced areas. Geo-fenced areas are pre-determined geographical zones that are mapped out on the web site 86. The boundaries of these geographical zones are determined by the end user of the web site 86. For example, the end user can request a geo-fenced area that encompasses a depot or service station owned by the end user. The boundaries of the geo-fenced area can surround the depot or service station, and the web site 86 can indicate to the end user which, if any, of the end user's generator sets 14 are located within that geo-fenced area. This permits the end user to determine whether a plurality of generator sets 14 are in transit (i.e. out of the geo-fenced areas) or are near a depot or service station (i.e. within the geo-fenced area). While an end user may select depots or service stations as the primary source for generation of geo-fenced areas, other areas or locations can also be used. For example, the end user could select any number of different areas or locations across the map on the web site 86 to set up geo-fenced areas.

The web site 86 provides the end user with information (both visual on the map and in list form) of the location and status of the generator sets 14. The web site 86 further provides information regarding the date and time when each generator set 14 last entered a particular geo-fenced area, a date and time when each generator set 14 last exited that same geo-fenced area, and a duration time indicating how long a particular generator set 14 has been inside of the geo-fenced area. Thus, the end user is easily able to monitor the entry and exit of generator sets 14 into and out of the pre-determined geo-fenced area. Additionally, the web site 86 further provides information regarding whether a particular generator set 14 is outside of the geo-fenced area and approaching the boundary of a geo-fenced area (i.e. in the process of entering the geo-fenced area), whether a generator set 14 is inside of the geo-fenced area and approaching the boundary of the geo-fenced area (i.e. in the process of exiting the geo-fenced area), or whether the generator set 14 is idle within the geo-fenced area (i.e. not moving at all).

The web site 86 also provides information regarding the last time a pre-trip inspection has been performed on the generator set 14. For example, the web site 86 indicates the date and time of the last pre-trip inspection performed on each generator set 14.

The information provided on the web site 86 is obtained initially via one or more of the generator set controller 50 and the generator telematics unit 58. This information is sent to the server antenna 82 from one or more of the generator set controller antenna 54 and generator set telematics unit antenna 62. This data is sent from the generator set controller antenna 54 and generator set telematics unit antenna 62 in data packets via a cellular network, though other networks or methods of transmission are also possible (e.g. satellite). In some embodiments the server antenna 82 also receives data from the refrigeration unit controller antenna 74. The data from the refrigeration unit controller antenna 74 is provided by the refrigeration unit controller 20, and can correspond to a status, for example, of the refrigeration unit 42, and/or alarms being experienced by the refrigeration unit 42. Once any data is received by the server antenna 82, this data is transferred via the internet to the web site 86 such that the data can be displayed on the web site 86 for use by the end user.

Figure 3:
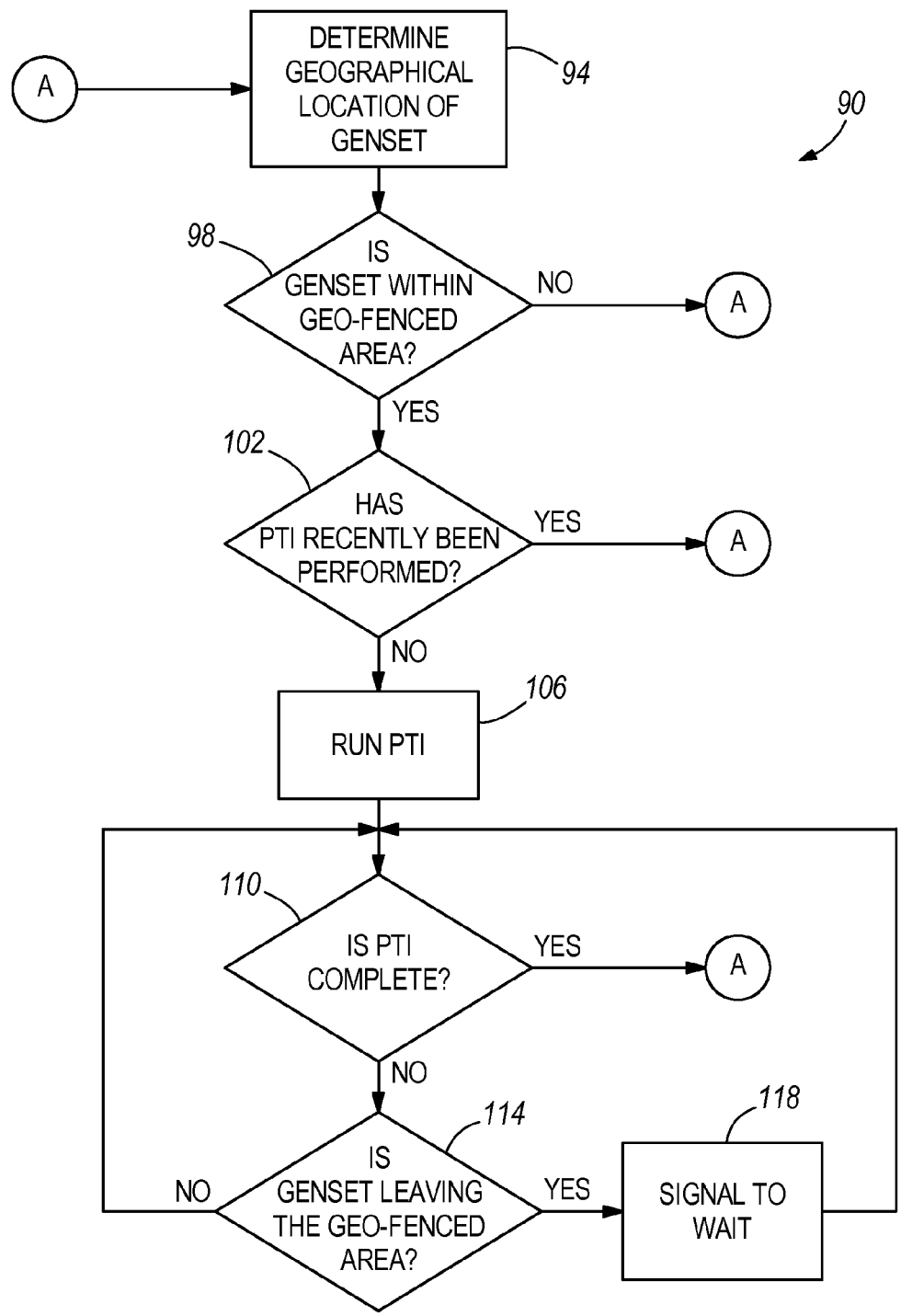
FIG. 3 is a flow chart illustrating a method of tracking and performing pre-trip inspections on the generator set of FIG. 1.

With reference to FIGS. 2 and 3, the generator set controller 50 is programmed to determine whether its associated generator set 14 is located within a geo-fenced area and whether the generator set 14 has recently undergone a pre-trip inspection ("PTI"). If the generator set 14 is located within the geo-fenced area and has not recently undergone a pre-trip inspection, the generator set controller 50 is programmed to initiate and complete a pre-trip inspection prior to the generator set 14 leaving the geo-fenced area. This programming of the generator set controller 50 helps ensure that each generator set 14 is ready for an upcoming journey (e.g. a cross-country journey), and that any pre-trip inspection is completed prior to the beginning of that journey. As noted above, generator sets 14 often get worn out or require maintenance after a long trip. While real-time alarm statuses indicating failure of particular components can help alleviate the problems of generator set wear, it is also advantageous to have a complete pre-trip inspection performed prior to a long journey. This pre-trip inspection involves a diagnostic inspection of a multitude of components to make sure that not only are the components not malfunctioning, but that they are in condition for a long journey. Advantageously, a generator set 10 will then be able to survive an entire trip without alarm or failure if the generator set 10 has passed a pre-trip inspection. Generator sets 10 which have not passed the pre-trip inspection and need maintenance and repair can be identified beforehand and if necessary can be taken out of service.

While pre-trip inspections can be completed within a geo-fenced area that encompasses a depot or service station, they can also be completed in other geo-fenced areas. Thus, the pre-trip inspections described herein are capable of being performed automatically, without the need for a technician, and without the need for manual control. This autonomous feature advantageously allows pre-trip inspections to be performed at any given geo-fenced area, regardless of whether a technician is present or not. Specifically, a pre-trip inspection can be performed immediately at the site of cargo delivery if desired, thus enabling the end user to identify whether the generator set 10 is ready to make a second trip, or return trip, to another location without having to wait for the generator set 10 to arrive at a depot or service station.

Referring to FIG. 3, in operation the generator set controller 50 executes a method 90. The generator set controller 50 first determines a geographical location of the generator set 14 in block 94. This determination of geographical location is accomplished via GPS technology. For example, the generator set controller 50 sends a signal or command to the generator set telematics unit 58. The generator set telematics unit 58 then sends at least one signal, via the generator set telematics antenna 62, to the remote satellite 66, which in turn sends at least one signal back to the generator set telematics antenna 62. This relay of signals between the generator set telematics antenna 62 and the remote satellite 66 pinpoints a geographical location of the generator set 14. The geographical location information received by the relay of signals between the generator set telematics antenna 62 and the remote satellite 66 is sent to the generator set telematics unit 58. The generator set telematics unit 58 then relays geographical location information on to the generator set controller 50, which in turn processes and/or stores the geographical location information of the generator set 14 via its microprocessor. While the location determination described above is described in the context of GPS technology, other technology can also be used to determine a location of the generator set 14, including but not limited to cellular technology. Additionally, while the method described above for determining location of the generator set 14 involves relaying signals between a generator set controller 50, generator set telematics unit 58, generator set telematics antenna 62, and a remote satellite 66, in other embodiments the generator set controller 50 and generator set telematics unit 58 may comprise a single unit. Additionally, in some embodiments both the generator set controller 50 and the generator set telematics unit 58 may each comprise a microprocessor for processing geographic location information. Other variations are also possible.

With continued reference to FIG. 3, after determining the geographic location of the generator set 14 in block 94, the generator set controller 50 then determines whether the generator set 14 is located within a geo-fenced area in block 98. As described above, the end user sets up one or more geo-fenced areas. These geo-fenced areas are displayed on the web site 86, such that the end user can visually determine whether or not a particular generator set 14 is located within the geo-fenced area at any given time. Information regarding the geo-fenced areas (e.g. boundaries, size, etc.) is stored on the server 78. Alternatively, or additionally, information regarding the geo-fenced areas is already stored on the microprocessor of the generator set controller 50. Thus, the server 78 can send a signal to the generator set controller 50 when a generator set 14 is in the geo-fenced area (i.e. by sending a signal from the generator set controller antenna 54 to the server antenna 82), or the generator set controller 50 can load or retrieve information already stored on the generator set controller 50 regarding the geo-fenced areas. In some embodiments, once the generator set controller 50 has information both regarding a current geographical location of the generator set 14 and the geo-fenced areas, the generator set controller 50 then compares the information and makes a determination as to whether or not the generator set 14 is within a geo-fenced area or not.

In some embodiments, the decision block 98 can instead include a determination by the generator set controller 50 of whether the generator set 14 is in the process of entering a geo-fenced area, rather than whether the generator set 14 is within the geo-fenced area. A determination of whether the generator set 14 is in the process of entering the geo-fenced area can be made for example by utilizing data regarding the geographic location of the generator set 14. Specifically, the generator set controller 50 can obtain at least two sets of data (e.g. from the web site 86 and/or generator set telematics unit 58) regarding the geographic location of the generator set 14 over a pre-determined time interval to determine the relative movement of the generator set 14, and specifically the direction of movement. The generator set controller 50 can be programmed to process the data regarding the geographic location information of the generator set 14 to determine whether the generator set 14 is moving towards and/or crossing a boundary of the geo-fenced area, thus indicating that the generator set 14 is entering the geo-fenced area. In some embodiments, the web site 86 itself can be configured to send a signal to the generator set controller 50 (i.e. via the server antenna 82 and one or more of the generator set controller antenna 54 and generator set telematics antenna 62) to indicate that the generator set 14 is entering a geo-fenced area.

With continued reference to FIG. 3, if the generator set controller 50 determines that the generator set 14 is not located within the geo-fenced area in block 98, the method returns back to block 94, at which time the generator set controller 50 again determines the geographical location of the generator set 14. The generator set controller 50 can be programmed to perform the operation of block 94 on a continuous basis. That is, every time the generator controller 50 determines that the generator set 14 is not located within a geo-fenced area, the generator set controller 50 can immediately check again on the geographic location of the generator set 14. Alternatively, the generator set controller 50 can be programmed to include a delay between each time the generator set controller 50 determines the geographic location of the generator set 14. For example, if in block 98 the generator set controller 50 determines that the generator set 14 is not located within the geo-fenced area, the generator set controller 50 can wait approximately one hour, two hours, twelve hours, or any other desired time interval, before the generator set controller 50 again determines the geographic location of the generator set 14.

If the generator set controller 50 determines that the generator set 14 is located within the geo-fenced area in block 98, then the generator set controller 50 proceeds to determine, in block 102, whether a pre-trip inspection has recently been performed. Specifically, the generator set controller 50 determines either whether a pre-trip inspection has been performed on the generator set 14 within the last 30 days. In other embodiments, the generator set controller 50 can determine whether a pre-trip inspection of the generator set 14 has been performed within the last 10 days, within the last 20 days, within the last 40 days, within the last 50 days, or any other number of days desired by the owner or operator of the generator set 14. In yet other embodiments the generator set controller 50 can determine whether a generator set 14 has recently been performed by determining whether a pre-trip inspection has been performed since the last time the generator set 14 entered the geo-fenced area.

With continued reference to FIG. 3, if the generator set controller 50 determines that the generator set 14 has undergone a pre-trip inspection within the last 30 days, the method returns back to block 94, at which time the generator set controller 50 again determines the geographical location of the generator set 14. As noted above, this repeat of block 94 can be delayed. For example, the generator set controller 50 can be programmed such that at least a predetermined period of time must elapse between each subsequent determination of the geographic location of the generator set 14. Thus, regardless of whether the method moves from block 98 back to block 94, or from block 102 back to block 104, the generator set controller 50 will wait the pre-determined time period before a determination is made again about the geographic location of the generator set 14.

If the generator set controller 50 determines that the generator set 14 has not undergone a pre-trip inspection within the last 30 days, the generator set controller 50 then initiates a pre-trip inspection, as shown in block 106. As noted above, the pre-trip inspection is a diagnostic inspection that examines various components of the generator set 14 to determine whether the generator set 14 is ready for continued use in an upcoming journey.

Specifically, the pre-trip inspection initiates a test of the electrical, prime mover, and alternator systems components of the generator set 14. The pre-trip inspection includes performing the followings steps, in order: 1) stopping the prime mover 34; 2) testing a buzzer on the generator set controller 50; 3) testing a display on the generator set controller; 4) testing an oil level switch; 5) testing an oil pressure switch; 6) testing a coolant temperature sensor; 7) testing a coolant level; 8) testing a speed solenoid relay; 9) testing a preheat relay; 10) testing a fuel hold relay; 11) testing a fuel pull relay; 12) testing a fuel level; 13) testing a start relay; 14) testing an output voltage; 15) starting the engine; 16) determining whether the output voltage is acceptable; 17) testing the oil pressure switch; and 18) testing the speed solenoid high and low. While various steps are listed above, in other embodiments the number or type of steps can vary. Thus, the pre-trip inspection can be varied or altered as desired, and programmed into the generator set controller 50.

With continued reference to FIG. 3, after initiating the pre-trip inspection, the generator set controller 50 determines in block 110 whether the pre-trip inspection is complete. The generator set controller 50 can immediately begin this determination after the pre-trip inspection has been initiated, or the generator set controller 50 can be programmed to wait a pre-determined time prior to first determining in block 110 whether the pre-trip inspection is complete. For example, the generator set controller 50 can be programmed to automatically wait 15 minutes before the generator set controller 50 proceeds to block 110 and determines whether the pre-trip inspection is complete.

If the generator set controller 50 determines that the pre-trip inspection is complete, the method returns to block 94, at which time the generator set controller 50 again determines the geographical location of the generator set 14. As noted above, in some embodiments the generator set controller 50 can be delayed, such that a pre-determined time period must elapse between any two successive determinations of the geographic location of the generator set 14. Thus, once the generator set controller 50 determines that the pre-trip inspection is complete, in some embodiments a delay will occur anytime before the generator set controller 50 again determines the geographical location of the generator set 14.

If in block 110 the generator set controller 50 determines that the pre-trip inspection is not complete, the generator set controller 50 then proceeds to determine, in block 114, whether the generator set 14 is leaving the geo-fenced area. A determination of whether the generator set 14 is leaving the geo-fenced area includes utilizing data regarding the geographic location of the generator set 14. Specifically, the generator set controller 50 obtains at least two sets of data (e.g. from the web site 86 and/or generator set telematics unit 58) regarding the geographic location of the generator set 14 over a pre-determined time interval to determine the relative movement of the generator set 14, and specifically the direction of movement. The generator set controller 50 is programmed to process the data regarding the geographic location information of the generator set 14 to determine whether the generator set 14 is moving towards a boundary of the geo-fenced area, thus indicating that the generator set 14 is leaving the geo-fenced area. In some embodiments, the web site 86 itself can be configured to send a signal to the generator set controller 50 (i.e. via the server antenna 82 and one or more of the generator set controller antenna 54 and generator set telematics antenna 62) to indicate that the generator set 14 is leaving a geo-fenced area.

If the generator set controller 50 determines that the generator set 14 is not leaving the geo-fenced area (e.g. the generator set 14 is stationary), the method returns to block 110, and the pre-trip inspection continues.

If the generator set controller 50 determines that the generator set 14 is leaving the geo-fenced area, the generator set controller 50 provides a warning to a driver, captain, engineer, or other person in charge of the vehicle or vessel carrying the generator set 14 as indicated in block 118. Specifically, the generator set controller 50 can send a signal, via the generator set controller antenna 54, to a remote receiver (e.g. in the cab of a truck that is hauling the shipping container 10 and generator set 14). Alternatively, the generator set controller can send a signal, via the generator set controller antenna 54 or via the generator set telematics antenna 62, to the server antenna 82. The signal can then be sent through the server 78 to the web site 86, where the end user can visually see that a generator set 14 is leaving the geo-fenced without the pre-trip inspection having been completed. The end user can then notify for example a vehicle driver, or anyone else the end user desires, in order to ask the driver to wait until the pre-trip inspection has been completed before the generator set 14 leaves the geo-fenced area.

Requiring that a driver, for example, wait until the pre-trip inspection has been completed ensures that the generator set 14 is fully inspected prior to the beginning of any long journey across country. Additionally, in cases where the geo-fenced areas surround depots or service stations, it ensures that the vehicle remains close to a depot or service station throughout the completion of the pre-trip inspection, such that in the event the pre-trip inspection identifies a component that needs fixing or replacement (or identifies that the entire generator set 14 needs replacement), the driver will be within short distance of a facility that can complete that repair or replacement. This creates an efficient system and method of inspecting, repairing, and/or replacing generator sets 14, and limiting the risk of generator sets 14 breaking down or requiring repair during the middle of a long journey.

Overall, the systems and methods described above efficiently keep track of generator sets 14 as they enter and exit geo-fenced areas, and inhibit the likelihood of damaged or worn generator sets 14 (e.g. those that may not survive another journey) from being used again in the field. Additionally, because the pre-trip inspections are performed automatically, and without the use of a technician or any manual control, the pre-trip inspections can be performed at any hour of the day, and on any day of the year, without the burden of waiting for a technician to arrive on site to perform the testing. This provides even greater efficiency and control of a fleet of generator sets 14.

In some embodiments, a technician can still be involved with one or more aspects of the pre-trip inspection. For example, a technician can be used to inspect certain components of the generator set 14, or can be used to "double check" the pre-trip inspection performed by the generator set controller 50. Even with the use of a technician, however, the method illustrated for example in FIG. 3 still permits the end user to monitor and track the positions of the generator sets 14, and advantageously permits the end user to ensure that each generator set 14 undergoes a pre-trip inspection before it leaves a designated geo-fenced area.

What is claimed is:

1. An automated method for diagnostic testing of a generator set used in association with a refrigerated container for transporting cargo, the generator set including a plurality of components, the method comprising:
    determining whether the generator set has entered a geo-fenced area;
    determining whether a pre-trip inspection is due to be performed on the generator set;
    automatically performing a pre-trip inspection on the generator set if the generator set is located within the geo-fenced area and a pre-trip inspection is due to be performed;
    determining whether the plurality of components is operating within acceptable limits; and
    generating a satisfactory pre-trip inspection report based on the plurality of components when the plurality of components is determined to be operating within acceptable limits, such that the generator set is approved for further use.

2. The method of claim 1 wherein determining whether the generator set has entered the geo-fenced area comprises utilizing a generator set telematics unit associated with the generator set to receive and/or send signals via satellite to a remote server.

3. The method of claim 2 wherein determining whether the generator set has entered the geo-fenced area further comprises connecting the server to a user-accessible web site to permit an end user to view, in real time, the location of the generator set on the user-accessible web site.

4. The method of claim 3 wherein the geo-fenced area is a geographically mapped area viewable on the user-accessible web site.

5. The method of claim 1 wherein determining whether a pre-trip inspection is due comprises determining whether a pre-trip inspection has been performed on the generator set since the generator set has last entered the geo-fenced area including determining a last entry date of the generator set into the geo-fenced area.

6. The method of claim 5 further comprising displaying the last entry date on a user-accessible web site.

7. The method of claim 1 wherein automatically performing a pre-trip inspection comprises running a diagnostic test of at least one of an oil level switch, an oil pressure switch, a coolant temperature sensor, a coolant level, a speed solenoid relay, a preheat relay, a fuel hold relay, a fuel pull relay, and a fuel level corresponding to the generator set.

8. The method of claim 7 wherein the pre-trip inspection is performed entirely by a generator set controller associated with the generator set, without manual operation.

9. The method of claim 1 further comprising determining whether the pre-trip inspection is complete, determining whether the generator set is leaving the geo-fenced area, and informing a driver if the pre-trip inspection is not complete and the generator set is leaving the geo-fenced area, so as to inhibit the driver from leaving the geo-fenced area until the pre-trip inspection is complete.

10. A generator set system for use in association with a refrigerated container for transporting cargo, the generator set system comprising:
    a generator set comprising a prime mover and a generator;
    a generator set telematics unit associated with the generator set, the generator set telematics unit comprising GPS technology to identify a geographical location of the generator set,
    a generator set controller associated with the generator set, the generator set controller comprising a microprocessor, the generator set controller programmed to be in communication with both the generator set and the generator set telematics unit, the generator set controller programmed to automatically perform a pre-trip inspection on the generator set while the generator set is within a geo-fenced area.

11. The generator set system of claim 10 wherein the generator set controller is programmed to perform the pre-trip inspection prior to the generator set leaving the geo-fenced area, and wherein the pre-trip inspection can be performed entirely by the generator set controller, without manual operation.

12. The generator set system of claim 10 wherein the generator set controller is programmed to determine a last entry date of the generator set into the geo-fenced area, and to determine whether a pre-trip inspection has been performed on the generator set since the last entry date.

13. The generator set system of claim 10 wherein the pre-trip inspection comprises running a diagnostic test of at least one of an oil level switch, an oil pressure switch, a coolant temperature sensor, a coolant level, a speed solenoid relay, a preheat relay, a fuel hold relay, a fuel pull relay, and a fuel level corresponding to the generator set.

14. The generator set system of claim 10 further comprising a generator set controller antenna and a generator set telematics antenna.

15. The generator set system of claim 10 wherein the generator set microprocessor is programmed to store information relating to previous locations and pre-trip inspection reports for the generator set, and to direct transmission of the information relating to previous locations and pre-trip inspection reports to a remote server for display on a user-accessible web site.

16. A refrigerated cargo system comprising:
a container for transporting cargo;
a refrigeration system comprising:
    a refrigeration unit located on or within the container; and
    a refrigeration unit controller that includes a first microprocessor, the refrigeration unit controller programmed to be in communication with the refrigeration unit;
a generator set system comprising:
    a generator set comprising a motor and generator; and
    a generator set controller that includes a second microprocessor, the generator set controller programmed to be in communication with both the generator set and the refrigeration unit controller, the generator set controller programmed to automatically perform a pre-trip inspection on the generator set while the generator set is within a geo-fenced area.

17. The refrigerated cargo system of claim 16 further comprising a generator set telematics unit comprising GPS technology to identify a geographical location of the generator set, the generator set controller programmed to be in communication with the generator set telematics unit.

18. The refrigerated cargo system of claim 16 further comprising a refrigeration unit controller antenna, a generator set controller antenna, and a generator set telematics antenna.

19. The refrigerated cargo system of claim 16 wherein the generator set controller is programmed to perform the pre-trip inspection prior to the generator set leaving the geo-fenced area.

20. The refrigerated cargo system of claim 16 wherein the pre-trip inspection comprises running a diagnostic test of at least one of an oil level switch, an oil pressure switch, a coolant temperature sensor, a coolant level, a speed solenoid relay, a preheat relay, a fuel hold relay, a fuel pull relay, and a fuel level corresponding to the generator set.

21. The refrigerated cargo system of claim 16, further comprising a remote server and a user-accessible web site, the remote server in communication with the generator set system so as to provide information regarding the generator set to the web site for user display.

22. The refrigerated cargo system of claim 16, wherein the generator set microprocessor is programmed to store information relating to previous locations and pre-trip inspection reports for the generator set, and to direct transmission of the information relating to previous locations and pre-trip inspection reports to a remote server for display on a user-accessible web site.

23. The refrigerated cargo system of claim 16, wherein the pre-trip inspection can be performed entirely by the generator set controller, without manual operation.

24. The refrigerated cargo system of claim 16, further comprising a power cord extending between the refrigeration system and the generator set system for directing electrical power from the generator set to the refrigeration unit.

25. The refrigerated cargo system of claim 16, wherein the generator set comprises a diesel motor, and the refrigeration unit comprises a condenser assembly and an evaporator assembly.

* * * * *